United States Patent Office 3,819,648

Patented June 25, 1974

3,819,648

PRODUCTION OF PHTHALIMIDE

Werner R. Boehme, Glen Ellyn, and Robert G. Agusto, Chicago, Ill., assignors to Dawe's Laboratories, Inc., Chicago, Ill.

No Drawing. Filed Nov. 12, 1971, Ser. No. 198,442
Int. Cl. C07d *27/52*
U.S. Cl. 260—326 R 8 Claims

ABSTRACT OF THE DISCLOSURE

A process of preparing phthalimide by contacting phthalic anhydride or phthalic acid with urea in the presence of a monocyclic or bicyclic aromatic liquid medium at an elevated temperature.

This invention relates to an improved process for producing phthalimide.

Phthalimide is an important intermediate in synthetic organic chemistry and is most frequently prepared by passing anhydrous ammonia over molten phthalic anhydride at a temperature of about 240° C. as part of the process which extends over several days. (See Cain, The Manufacture of Intermediate Products for Dyes, 2nd Edition, Macmillan, London, 1919.)

As is described in "Organic Syntheses," Vol. 1, John Wiley & Sons, New York, 1932, phthalimide can also be prepared by gradually heating phthalic anhydride with aqueous ammonia or ammonium carbonate to temperatures of 300° C.

It is also known that phthalimide can be prepared by the reaction of phthalic anhydride with urea. For example, Herzog (Z. Angew. Chem. 1919, *1*, 301) describes such a method which could be used on a laboratory scale. However, because of the strongly exothermic nature of the reaction between phthalic anhydride and urea only smal quantities of phthalimide can be produced by this procedure. The difficulty of removing the heat of reaction of the hazardous, self-sustaining reaction between phthalic anhydride and urea precludes use of the process in large scale commercial manufacturing operations.

In addition, Piutti (Gazz. Chem. Ital., *12*, 170; Ann. *214*, 18) as well as others report that phthalimide was the only product obtained when phthalic anhydride and urea were heated to temperatures above 130° C. Piutti also reports that phthalimide can be formed by heating phthalic acid monoureide or phthalic acid monothioureide. However, such procedures are not suitable for the manufacture of phthalimide on a commercial scale because of the low yields obtained and the long reaction times required.

It is accordingly an object of the present invention to provide an improved process for producing phthalimide in which the foregoing disadvantages can be overcome, and it is a more specific object of the invention to provide a process for producing phthalimide which can be applied on a commercial scale, which permits a significant shortening of the reaction time, which permits the use of a lower reaction temperature and which is capable of providing a product of improved purity.

In accordance with the concepts of the present invention it has been found that the phthalimide can be produced by reaction of phthalic acid or phthalic anhydride with urea by carrying out the reaction in the presence of a liquid aromatic medium in which the urea is substantially insoluble and in which the phthalic acid or anhydride is only slightly soluble. The use of a liquid aromatic reaction medium permits a lower reaction temperature and significantly lower reaction times to produce an easily filterable, crystalline product of improved purity.

As the liquid aromatic medium, use can be made of one or more aromatic compounds substituted by one or more alkyl groups containing 1 to 4 carbon atoms (e.g. methyl, ethyl, propyl, etc.), alkoxy groups containing 1 to 4 carbon atoms (e.g. methoxy, ethoxy, propoxy, etc.) or halogen. The aromatic compounds are preferably hydrocarbons containing 6 to 25 carbon atoms; however, aromatic hydrocarbons in which one or more of the nuclear carbon atoms has been substituted by a nitrogen atom in the aromatic ring can also be used.

Representative of suitable liquid aromatic reaction medium include the following:

n-propylbenzene, n-butylbenzene, mesitylene, cumene, pseudo-cumene, 1-methylnaphthalene, 2-methylnaphthalene, diisopropylnaphthalene, di-tertiary-butylnaththalene, anisole, phentole, p-cresyl methyl ether, alpha-naphthyl methyl ether, 1,2-dichlorobenzene, o-chlorotoluene, p-chlorotoluene, etc.

Representative of the ring N-substituted aromatic media which can be used in the practice of this invention include the isomeric picolines, lutidines, 2-methyl-5-ethyl pyridine, as well as alkyl, alkoxy and/or halogen substituted quinolines and isoquinolines. In addition, quinoline and isoquinoline can also be used in the practice of this invention.

It will be understood that it is frequently desirable to make use of mixtures of two or more of the foregoing aromatic compounds, particularly where such mixtures are commercially available. However, it has been found that aliphatic media or media containing high proportions of aliphatic hydrocarbons, such as kerosenes and mineral oil, are unsuitable for use in the present invention.

As indicated above, the phthalic acid or anhydride is contacted with urea in the presence of the aromatic medium at an elevated temperature. It has been found that temperatures within the range of 130 to 230° C. generally yield best results, with the preferred temperature being 160 to 170° C. As will be appreciated, the reaction temperature depends somewhat upon the boiling point of the aromatic medium, thus, use should be made of a reaction temperature at or below the boiling point of the particular aromatic medium being used, since it is undesirable to make use of superatmospheric pressures in carrying out the reaction because carbon dioxide and ammonia are evolved.

The reaction rates required in the process of this invention are significantly less as compared to those of the prior art. Normally, reaction rates from 1 to 6 hours, and preferably about 3 hours, can be used. Similarly, the relative proportions of the phthalic acid or anhydride and urea can be varied within fairly wide ranges and are not critical to the practice of the invention. Use is generally made of between 0.5 to 2.0 moles of urea per mole of phthalic acid or anhydride, and preferably 0.75 to 1.0 mole of urea per mole of phthalic acid or anhydride.

In carrying out the reaction, the phthalic acid is contacted with the urea in the presence of the aromatic medium for the desired reaction time. Thereafter, the reaction mixture can be cooled and the liquid phase containing the aromatic medium removed by any convenient means, such as filtration, centrifugation, etc. The crystalline product, which remains after removal of the aromatic medium, can be washed with water to yield a very pure grade of phthalimide usually in yields of 95 to 100% based upon the phthalic anhydride or phthalic acid starting material.

Having described the basic concepts of the present invention, reference is now made to the following examples which are provided by way of illustration and not by way of limitation, of the practice of the invention.

EXAMPLE 1

A mixture of 332 parts of phthalic acid, 120 parts of urea and 1000 parts of Cyclo Sol 53 (a proprietary solvent of the Shell Chemical Company consisting of about 99% aromatic hydrocarbons principally in the $C_9$–$C_{11}$ range and containing about 15% 1-methyl-3-ethylbenzene; 12% 1,3,5-trimethylbenzene, n-butylbenzene and isobutylbenzene; 35% 1,2,4-trimethylbenzene) is slowly heated with agitation to about 170° C. and held at this temperature for 3 hours. A little water distills as an azeotrope with the solvent and is discarded while the solvent is returned to the reaction vessel. Carbon dioxide and some ammonia are evolved during the heating period.

The suspension is allowed to cool to about 70° C. and is centrifuged, saving the solvent for reuse in the subsequent batch of phthalimide to be made as desired. The filter cake is washed with water and dried to give 282 parts (96%) of phthalimide, m.p. 232–235° C.

EXAMPLE 2

The procedure of Example 1 is repeated, using 296 parts of phthalic anhydride instead of the phthalic acid. Phthalimide is again obtained in 95% yield, m.p. 233–5° C.

EXAMPLE 3

The procedure of Example 1 is repeated, using 1000 parts of Enco 150 (a product of Humble Oil Company consisting of 97% aromatic hydrocarbons of which about 54% are $C_{10}$ hydrocarbons and 18.5% are $C_{11}$ hydrocarbons) in place of Cyclo Sol 53 as the reaction medium. The yield of phthalimide is 95%, m.p. 233–5° C.

EXAMPLE 4

The procedure of Example 1 is repeated, using as the reaction medium 1000 parts of an approximately equal mixture of 1- and 2-methylnaphthalenes. The mixture is heated at 220° C. for 3 hours and gives a 94% yield of phthalimide, m.p. 232–4° C.

EXAMPLE 5

The procedure of Example 1 is repeated, using 1000 parts of anisole as the reaction medium. The yield of phthalimide is 96%, m.p. 234–5° C.

EXAMPLE 6

166 parts of phthalic acid, 60 parts of urea and 1000 parts of 2-methyl-5-ethylpyridine are refluxed with stirring for 3 hours and steam distilled to recover the 2-methyl-5-ethylpyridine. The residual crystalline suspension is filtered, washed well with water and dried. The yield of phthalimide was 90%, m.p. 233–4° C.

EXAMPLE 7

The procedure of Example 1 is repeated, using 1000 ml. of o-dichlorobenzene as the solvent. The yield of phthalimide is 93%, m.p. 233–4° C.

It will be understood that various changes and modifications can be made in the details of procedure, formulation and use without departing from the spirit of the invention, especially as defined in the following claims.

We claim:

1. In a process for the preparation of phthalimide by reaction of phthalic acid or anhydride with urea, the improvement comprising contacting the phthalic acid or anhydride with urea in the presence of a liquid aromatic reaction medium in which the urea is substantially insoluble and in which the phthalic acid is slightly soluble, said medium being selected from the group consisting of monocyclic and bicyclic aromatic hydrocarbons containing 6 to 25 carbon atoms, monocyclic and bicyclic hydrocarbons substituted by a nitrogen atom in the aromatic ring and containing 5 to 25 carbon atoms and the lower alkyl, lower alkoxy and halogen substituted derivatives thereof, and mixtures thereof.

2. A process as defined in claim 1 wherein the aromatic compound is selected from the group consisting of aromatic hydrocarbons containing 6 to 25 carbon atoms and aromatic hydrocarbons substituted by at least one nitrogen atom in the aromatic ring and containing 5 to 25 carbon atoms.

3. A process as defined in claim 1 wherein the reaction is carried out at a temperature within the range of 130–230° C.

4. A process as defined in claim 1 wherein the mole ratio of urea to phthalic acid or anhydride is within the range of 0.5:2.0.

5. A process as defined in claim 1 wherein the reaction is carried out at a temperature within the range of 160–170° C.

6. A process as defined in claim 1 wherein the reaction is carried out for 1 to 6 hours.

7. In a process for the preparation of phthalimide by reaction of phthalic acid or anhydride with urea, the improvement comprising contacting the phthalic acid or anhydride with urea in the presence of a liquid aromatic reaction medium in which the urea is substantially insoluble and in which the phthalic acid is slightly soluble, said medium being selected from the group consisting of n-propylbenzene, n-butylbenzene, mesitylene, cumene, pseudo-cumene, 1 - methylnaphthalene, 2-methylnaphthalene, diisopropylnaphthalene, di-tertiary-butylnaphthalene, anisole, phenetole, p-cresyl methyl ether, alpha-naphthyl methyl ether, 1,2-dichlorobenzene, o-chlorotoluene, p-chlorotoluene, picolines, lutidines, 2-methyl-5-ethyl pyridine, quinoline, isoquinoline and the alkyl alkoxy and/or halogen substituted quinolines and isoquinolines, and mixtures thereof.

8. A process as defined in claim 7 wherein the aromatic medium is a mixture of alkyl substituted benzenes.

References Cited

Piutti: Ann., vol. 214, pp. 18–20 (1882).

JOSEPH A. NARCAVAGE, Primary Examiner